Oct. 3, 1961
W. J. BERNARD ET AL  
NON-AQUEOUS ELECTROLYTE
3,003,089
Filed June 27, 1958
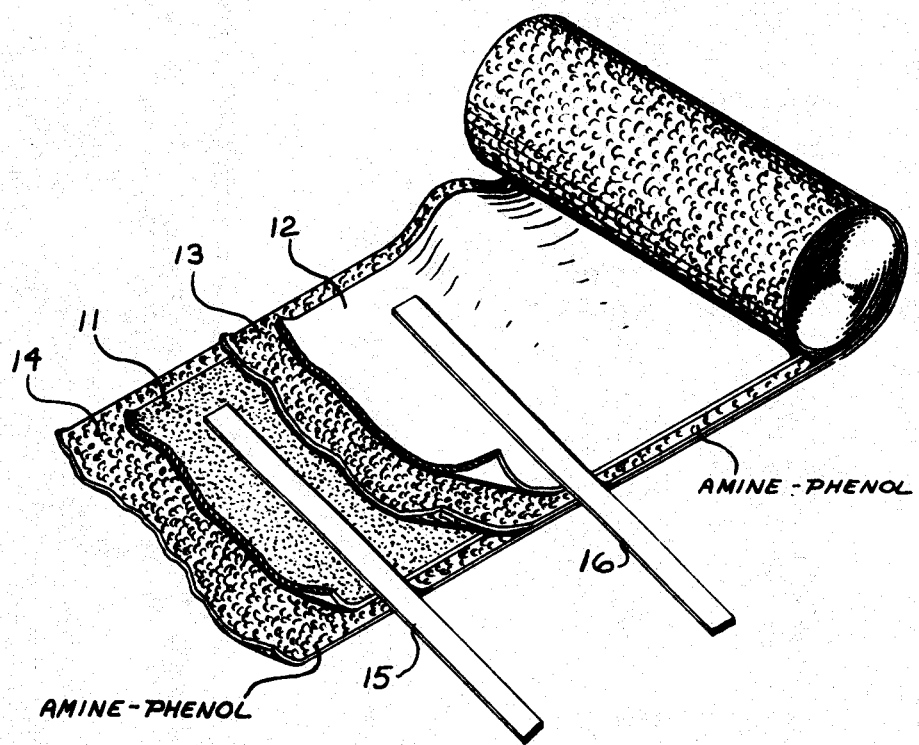
WALTER J. BERNARD  
AND  
ROBERT P. AUTY  
INVENTORS
BY Roland A. Dexter
ATTORNEY

3,003,089
NON-AQUEOUS ELECTROLYTE

Walter J. Bernard and Robert P. Auty, Williamstown, Mass., assignors to Sprague Electric Company, North Adams, Mass., a corporation of Massachusetts
Filed June 27, 1958, Ser. No. 745,221
5 Claims. (Cl. 317—230)

This invention relates to a new improved type of electrolyte. More particularly, it relates to a non-aqueous electrolyte which is particularly advantageous for use in various electrical devices, such as for example, electrolytic capacitors.

Any history of the development of electrolytic capacitors would find a substantial segment of it largely concerned with the electrolytes used in such devices. The earlier development finds many inorganic aqueous systems, such as solutions of various inorganic salts, acids or bases employed as the electrolytes in such capacitors. The electrolytes of this broad category have many inherent disadvantages, not the least of which is the limitation that they could not be employed over a very extensive range of temperatures due to the inherent property of the solvent in such systems. Regardless, the capacitor industry has more or less universally accepted an electrolyte for electrolytic capacitors which consists of viscous mixtures of polyhydric alcohols, water and either boric acid or various salts, such as ammonium pentaborate. However, there still exists the temperature limitation of the aqueous systems which must be overcome to satisfy the demands of operational electronics.

It is therefore an object of the present invention to produce a new type of electrolyte, non-aqueous in nature, which can be used over extremely wide temperature ranges and which possesses comparatively good electrical characteristics, including good conductivity through the wide temperature range.

It is a further object of this invention to provide a novel conducting medium which may be used solely or in combination with a non-aqueous solvent as the electrolyte of an electrolytic capacitor.

Further objects of the invention, as well as the advantages of it, will be apparent from the specification and the appended drawing.

Briefly, the above aims were achieved by the production of a non-aqueous electrolyte of phenol and an alkyl or alkanol amine having a formula

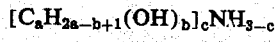

wherein $a$ is an integer from 2 to 6, $b$ is an integer from 0 to 1 and $c$ is an integer from 1 to 3. The phenol amine electrolyte may be dissolved in a solvent. The solvent for the phenol amine solute is one selected from a preferred group of solvents. This group is made up of alkanols having the formula

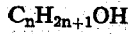

wherein $n$ is an integer from 1 to 6; alkyl phosphates having the formula

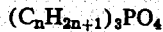

wherein $n$ is an integer from 1 to 4; polyhydroxy alcohols having the formula

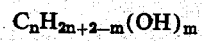

wherein $n$ is an integer from 3 to 4 and $m$ is an integer from 2 to 3; and also ethylene glycol. The solvent selected from this group is mixed with the phenol amine solute in a percentage of from 30% to 60% of the solvent by weight of the phenol amine solute.

In a more limited sense the foregoing objects have been achieved in accordance with this invention by the production of an electrolytic capacitor having the above described electrolyte contiguous with an electrolytically formed anode and cathode.

The electrolyte provides relatively low resistivity over a wide range of temperature of operation. It is a particular feature of this invention that the electrolyte solution composed from unequal molar amounts of phenol and organic base according to this invention produces a conducting system of unexpectedly and unpredictably low resistivity over a wide temperature range. The organic base includes the lower alkyl and hydroxy substituted alkyl amines. The range of minimum resistivity occurred with the amine present in the mixture, from about 5 mol percent to about 25 mol percent of the total solute. Further, when these systems having usefully low resistivities are utilized as the conducting medium of electrolytic capacitor electrolytes, they do not apparently deteriorate the dielectric film as taught by United States Patent No. 2,662,995. Their usefulness was still further enhanced by the non-adherence of the electrical decomposition products to the dielectric film which materially degrades many non-aqueous electrolytes, this latter characteristic being substantiated from their excellent electrical characteristics when subjected for extended periods of use in operational circuits. The utility of the conducting mixture has been found to apply equally well to its use as the sole electrolyte for electrolytic capacitors, or alternatively, when used as the solute in a non-aqueous conducting system for electrolytic applications.

Of course it is to be understood that the organic acid includes, in addition to phenol, halogen substituted phenols, e.g. o-chlorophenol, p-chlorophenol, m-chlorophenol, fluorophenol and lower alkyl substituted phenols, e.g. o-cresol, m-cresol, and p-cresol.

These amines which have been found useful in the practice of this invention are hereinafter set forth:

Dipropylamine
Tripropylamine
Dibutylamine
Tributylamine
Dipentylamine
Tripentylamine
Propanolamine
Dipropanolamine
Tripropanolamine
Butanolamine
Dibutanolamine
Tributanolamine Hexylamine
Dihexylamine
Trihexylamine
Ethanolamine
Diethanolamine
Triethylanolamine
Pentanolamine
Dipentanolamine
Tripentanolamine
Hexanolamine
Dihexanolamine
Trihexanolamine It is thus seen that the scope of the invention extends to lower alkyl and lower hydroxy alkyl substituted amines, which amines may be primary, secondary or tertiary admixed with phenol. To be suitable as an electrolyte for electrolytic capacitors or similar devices it is necessary that a minimum level of resistivity be obtained so as to not have excessive power factors of the devices and thus for the purposes of this invention the amines should be present in the conducting system in less than equal molar fractions of the amine-phenol solute, preferably within the range of from 5 mol percent to about 25 mol percent of the said conducting solute. Specifically, for the resistivities necessary in the practice of this invention the electrolyte should be less than 10,000 ohm-centimeters resistivity and preferably of 5000 ohm-centimeters or less.

Reference is now made to the appended drawing in which 10 represents a capacitor roll, partially unwound. 11 is the anode of the capacitor made of a so-called valve metal (for example, aluminum, tantalum, zirconium, titanium) having on its surface an oxide layer which functions as the dielectric. Cathode 12 is made of a valve metal or an inert metal such as silver depending upon the particular application and its inherent requirements.

13 and 14 each represent a porous spacer such as kraft or Benares paper, glass cloth, polyethylene or polytetrafluoroethylene resin, or other well-known types of porous material suitable, imposed between the anode 11 and cathode 12 for physical separation of the two elements. Spacers 13 and 14 are impregnated with the alkyl or alkanol amine-phenol conducting mixture of the invention either solely or as a solute dissolved in a non-aqueous solvent. Tabs 15 and 16 are connected to the two electrode foils as terminals. Although the anode in the drawing is shown as a foil, the conducting of our invention is equally suitable for etched wires and porous pellets.

The following examples of this invention relate to various specific embodiments thereof and are set forth for the purpose of illustration only and are not intended to be limitative.

EXAMPLE I

Electrolytic capacitors were made up consisting of a 2 mil thick aluminum foil of 99.99% purity, electrochemically etched and thereafter formed in a boric acid solution to 500 volts having 10 square inches area as the anode, a one mil unformed, unetched aluminum foil as the cathode, and three one-mil thick Benares paper spacers between the formed anode and unformed cathode. An electrolyte consisting of butylamine admixed with phenol, 15 mol percent of the tri-n-butylamine to 85 mol percent of phenol was introduced in the aforementioned capacitor structure at 25° C. temperature by conventional techniques. The unit was found to have an operational temperature range which extends beyond from −20° C. to +125° C., a very low internal resistance, relatively constant capacitance over the entire temperature range, and is further featured by a relatively low dissipation factor over the entire range. The results set forth in Example I may be reproduced with the electrolytes of the following examples when used in the capacitor structure described in Example I:

Example II: 20 mol percent of butylamine and 80 mol percent of phenol.

Example III: 16 mol percent of di-n-butylamine and 84 mol percent of phenol.

Example IV: 14 mol percent of diethanolamine and 86 mol percent of phenol.

Example V: 12 mol percent of triethanolamine and 88 mol percent of phenol.

Example VI: 7 mol percent of dipropylamine and 93 mol percent of phenol.

Example VII: 15 mol percent of tripentylamine and 85 mol percent of phenol.

Example VIII: 25 mol percent of hexylamine and 75 mol percent of phenol.

Example IX: 23 mol percent of butanolamine and 77 mol percent of phenol.

Example X: 20 mol percent of propanolamine and 80 mol percent of phenol.

Example XI: 17 mol percent of tripentanolamine and 83 mol percent of phenol.

Example XII: 21 mol percent of dihexanolamine and 79 mol percent of phenol.

Solvents

As previously stated, the conducting medium forming the subject matter of this invention can be used either in its unmodified form or as the solute in a solute-solvent system for such electrolytic applications as may be desired. In the utilization of the various solutes set forth in this specification consideration must be given to two fundamental aspects, namely the level of solubility required for any desired application, i.e. the resistivity of the system and the temperature range required for operation, and the ability of the oxidizing portion of the solute to perform its fundamental task, with particular reference to electrolytic capacitor applications, in the particular solvent which is being used. This oxidation function, commonly called self-healing, is required in a working electrolyte so as to reform any portion of the dielectric film which might suffer electrical breakdown during operation. Thus, after any breakdown of the dielectric, the solute must immediately, under the influence of the potential imposed across the electrodes, reform the film to produce an insulation coating substantially that of the primary dielectric, for if it does not, excessive leakage as well as loss of capacity results.

The solvent used is preferably in proportion of from 30% to about 60% by weight of the dissolved solute. The ratio of the solute to the solvent in the electrolyte has an effect upon the low temperature capacitance of the electrolyte. Capacitance rapidly decreases in electrolytes below a certain temperature. This temperature below which the capacitance decreases is largely influenced by the amount of solute in the electrolyte.

As pointed out above, the preferred solvents for the electrolyte systems are alkyl phosphates, lower alkanols and polyhydroxy alcohols as defined and also ethylene glycol. The solvents are characterized by a high boiling point (150° C.) and/or low freezing point (−60° C.). Other advantages are high dielectric constant, minimum interaction with the dielectric film and effective dissolution of electrolysis products. Suitable alkyl phosphates include tertiary esters with relatively simple alkyl radicals. Suitable lower alkanols include butanol, ethanol, propanol, methanol, pentanol and heptanol. The polyhydroxy alcohols include propylene glycol, ethylene glycol, low molecular weight polyglycols and glycerine.

Alkyl phosphate solvents

The alkyl phosphates include the tertiary esters wherein the alkyl radicals are methyl, ethyl, propyl, isopropyl, n-butyl, n-amyl, iso-amyl and hexyl. Representative solvents of this class with their respective boiling points are as follows:

| Compound: | Boiling point (° C./mm. pressure) |
|---|---|
| Trimethyl phosphate | 197.2/760 |
| Dimethyl ethyl phosphate | 203.3/760 |
| Triethyl phosphate | 216/770 |
| Tripropyl phosphate | 138/47 |
| Tri-n-butyl phosphate | 123/15 |
| Tri-isoamyl phosphate | 143/3 |
| Butyl di-isoamyl phosphate | 145/4.5 |

For a more detailed disclosure of non-aqueous solvents for electrolytic capacitor systems refer to the copending Ross applications, Serial No. 365,519, filed July 1, 1953, now abandoned, and Serial No. 590,711, filed June 11, 1956, issued as Patent No. 2,934,681 on April 26, 1960.

A number of further typical examples in the practice of the invention employing alkyl phosphate solvents are given below:

EXAMPLE XIII

Electrolytic capacitors were made up consisting of a 2 mil thick aluminum foil of 99.99% purity, electrochemically etched and thereafter formed to 500 volts in a representative electrolyte of the invention, 13% by weight of tri-n-butyl amine, 51% by weight of phenol, 36% by weight of tri-n-butyl phosphate, having 10 square inches area as the anode, a one mil unformed, unetched aluminum foil as the cathode, and three one-mil thick Benares paper spacers between the formed anode and unformed cathode. An electrolyte consisting of the above tri-n-butylamine-phenol-tri-n-butyl phosphate was introduced in the aforementioned capacitor structure at 25° C. temperature by conventional techniques. The unit was found to have an operational temperature range which extends beyond from −20° C. to +150° C., relatively constant capacitance over the entire temperature range, and is further featured by a relatively low dissipation factor over the entire range. The results set forth in Example XIII may be reproduced with the electrolytes of the following examples when used in the capacitor structure described in Example XIII:

Example XIV: 20 mol percent of butylamine and 80 mol percent of phenol dissolved in 40% by weight of tri-n-butyl phosphate.

Example XV: 16 mol percent of di-n-butyl amine and 84 mol percent of phenol dissolved in 35% by weight tri-n-butyl phosphate.

Example XVI: 14 mol percent of diethanolamine and 86 mol percent of phenol dissolved in 35% by weight of dimethyl ethyl phosphate.

Example XVII: 12 mol percent of triethanolamine and 88 mol percent of phenol dissolved in 40% by weight of triethyl phosphate.

Example XVIII: 7 mol percent of dipropylamine and 93 mol percent of phenol dissolved in 36% by weight of tripropyl phosphate.

Example XIX: 15 mol percent of tripentylamine and 85 mol percent of phenol dissolved in 32% by weight of tripentyl phosphate.

Example XX: 25 mol percent of hexylamine and 75 mol percent of phenol dissolved in 30% by weight of tri-hexyl phosphate.

Example XXI: 20 mol percent of propanolamine and 80 mol percent of phenol dissolved in 50% by weight of trimethyl phosphate.

Example XXII: 17 mol percent of tripentanolamine and 83 mol percent of phenol dissolved in 45% by weight of butyl di-isoamyl phosphate.

Example XXIII: 21 mol percent of dihexanolamine and 79 mol percent of phenol dissolved in 40% by weight of butyl di-isoamyl phosphate.

*Polyhydroxy alcohol solvents*

The polyhydroxy alcohol solvents include generally the lower molecular weight compounds. For the most part they are characterized by the formula indicated above. Ethylene glycol is also a suitable polyhydroxy alcohol solvent within this invention. The following examples illustrate the invention as applied to the polyhydroxy alcohol solvents of the formula and ethylene glycol.

EXAMPLE XXIV

Electrolytic capacitors were made up consisting of a 2 mil thick aluminum foil of 99.99% purity, electrochemically etched and thereafter formed to 500 volts in a representative electrolyte of the invention, 15% by weight of tri-n-butylamine, 45% by weight of phenol, 46% by weight of ethylene glycol, having 10 square inches area as the anode, a one mil unformed, unetched aluminum foil as the cathode, and three one-mil thick Benares paper spacers between the formed anode and unformed cathode. An electrolyte consisting of the above tri-n-butyl-amine-phenol-ethylene glycol was introduced in the aforementioned capacitor structure at 25° C. temperature by conventional techniques. The unit was found to have a wide operational temperature range, particularly low temperature operation to —30° C., a very low internal resistance, relatively constant capacitance over the entire temperature range, significantly lower leakage currents when used as a formation electrolyte, and is further featured by a relatively low dissipation factor over the entire range. Similar results were obtained with the electrolytes of the following examples when used in the capacitor structure described in Example XXIV:

Example XXV: 22 mol percent of butylamine and 78 mol percent of phenol dissolved in 40% by weight of trimethylene glycol.

Example XXVI: 18 mol percent of di-n-butylamine and 82 mol percent of phenol dissolved in 35% by weight tetramethylene glycol.

Example XXVII: 13 mol percent of diethanolamine and 87 mol percent of phenol dissolved in 35% by weight of diethylene glycol.

Example XXVIII: 12 mol percent of triethanolamine and 88 mol percent of phenol dissolved in 40% by weight of ethylene glycol.

Example XXIX: 7 mol percent of dipropylamine and 93 mol percent of phenol dissolved in 36% by weight of glycerol.

Example XXX: 24 mol percent of hexylamine and 76 mol percent of phenol dissolved in 30% by weight of glycerol.

Example XXXI: 20 mol percent of propanolamine and 80 mol percent of phenol dissolved in 60% by weight of trimethylene glycol.

*Lower alkanol solvents*

This invention also applies to lower alkanol solvents, as for example, ethanol, propanol, amyl alcohol, and hexanol including their respective isomers. The following examples illustrate the practice of this invention with alkanol solvents.

EXAMPLE XXXII

Electrolytic capacitors made up consisting of a 2 mil thick aluminum foil of 99.99% purity, electrochemically etched and thereafter formed to 500 volts in a representative electrolyte of the invention, 15% by weight of tri-n-butyl amine, 45% by weight of phenol, 46% by weight of n-butanol, having 10 square inches area as the anode, a one mil unformed, unetched aluminum foil as the cathode, and three one-mil thick Benares paper spacers between the formed anode and unformed cathode. An electrolyte consisting of the above tri-n-butylamine-phenol-n-butanol was introduced in the aforementioned capacitor structure at 25° C. temperature by conventional techniques. The unit was found to have a wide operational temperature range, particularly low temperature operation to —30° C. and lower, a very low internal resistance, relatively constant capacitance over the entire temperature range, significantly lower leakage currents when used as a formation electrolyte and is further featured by a relatively low dissipation factor over the entire range. Similar results were obtained with the following electrolytes when used in the capacitor structure described in Example XXXII:

Example XXXIII: 22 mol percent of butylamine and 78 mol percent of phenol dissolved in 40% by weight of n-butanol.

Example XXXIV: 18 mol percent of di-n-butylamine and 82 mol percent of phenol dissolved in 35% by weight hexanol.

Example XXXV: 13 mol percent of diethanolamine and 87 mol percent of phenol dissolved in 35% by weight of ethanol.

Example XXXVI: 12 mol percent of triethanolamine and 88 mol percent of phenol dissolved in 40% by weight of ethanol.

Example XXXVII: 7 mol percent of dipropylamine and 93 mol percent of phenol dissolved in 36% by weight of n-propanol.

Example XXXVIII: 15 mol percent of tripentylamine and 85 mol percent of phenol dissolved in 32% by weight of n-amyl alcohol.

Example XXXIX: 24 mol percent of hexylamine and 76 mol percent of phenol dissolved in 30% by weight of n-hexanol.

Example XL: 17 mol percent of tripentanolamine and 83 mol percent of phenol dissolved in 45% by weight of n-amyl alcohol.

Example XLI: 21 mol percent of dihexanolamine and 79 mol percent of phenol dissolved in 40% by weight of hexanol.

Various advantages of this electrolyte and advantages provided capacitors by the use of this electrolyte have been indicated above. The amine-phenol non-aqueous systems of this invention improve the electrical characteristics of the electrolytes by extended operational life.

Further, the amine-phenol conducting mixture of the invention, as well as the non-aqueous systems in which it is taught to be incorporated, is non-corrosive in nature and characterized by such low vapor pressures at elevated temperatures that in most applications below 150° C. venting of the electrolytic capacitor or electrical component is not necessary.

In referring to the electrolyte herein as non-aqueous the description applies to the fact that no water is included in the preparation of the electrolyte system and there are no water producing reactions in the electrolyte. A trace of water in the product electrolyte is not objectionable. The non-aqueous designation of the electrolyte as set forth herein is in contrast to the use of such a designation in prior art disclosures where the expression has been used to merely mean that relatively little water was present in the electrolyte, that is, less than 3 to 5%. The term non-aqueous as used herein refers to the existence of no more than a trace amount of water.

With the alkyl phosphate as the solvent for the conducting medium of a lower alkyl amine-phenol the solute should be within the range of about 30% to about 60% by weight of the total electrolyte. An example of a suitable electrolyte for impregnation of the foregoing capacitor structure is 13% by weight of tri-n-butyl phosphate. For the defined polyhydroxy alcohol solvents, alkanol solvents and ethylene glycol the solute should be within the range of from about 30% to about 50% of the total electrolyte. Satisfactory electrolytes for the latter two solvent classes are by weight: 15% tri-n-butylamine, 45% phenol and 40% ethylene glycol; 15% tri-n-butylamine, 45% phenol and 40% butanol, respectively.

Electrical devices such as the capacitors which are operable over the extreme temperature range previously indicated in the specification of necessity undergo marked physical structural changes when transversing the entire breadth of this range. For this reason the containment of the liquid electrolytes presents possible difficulties unless measures are taken to prevent their egress. Further, it is necessary to maintain the electrodes fully insulated one from the other. For these reasons the temperature stabile resin dielectrics, such as polytetrafluoroethylene, are finding rapid acceptance as dielectric gaskets and washers of high resistivity and chemical inertness. It has been found practical to contain the electrolyte within the electrical component by utilizing a structure similar to that forming the basis of the United States patent application, Serial No. 340,710, filed March 6, 1953, now abandoned, which has been modified by the insertion of a steel spring washer at the bottom of the cup-like or alternatively tube-like container. The crimping assembly is such that the capacitor is forced downward against a steel spring washer so that it remains in a continuous stressed state, which thus serves to yield sufficient pressure over the entire temperature range so as to prevent egress of the liquid electrolyte from the electrical device and maintain the anodes fully immersed in the electrolyte.

As many apparently widely different embodiments of this invention may be made without departing from the spirit and scope hereof, it is to be understood that the invention is not limited to the specific embodiments hereof except as defined in the appended claims.

This application is a continuation-in-part of our co-pending applications, Serial No. 507,838, filed May 12, 1955, now abandoned; Serial No. 507,839, filed May 12, 1955, now abandoned; Serial No. 507,840, filed May 12, 1955, now abandoned, and Serial No. 507,835, filed May 12, 1955, now abandoned.

What is claimed is:

1. A non-aqueous electrolyte comprising a mixture of phenol and an amine selected from the group consisting of alkanol and alkyl amines having a formula $$[C_aH_{2a-b+1}(OH)_b]_cNH_{3-c}$$

wherein $a$ is an integer from 2 to 6, $b$ is an integer from 0 to 1 and $c$ is an integer from 1 to 3, said mixture dissolved in a useable concentration in a solvent selected from the group consisting of alkanols having the formula $$C_nH_{2n+1}OH$$

wherein $n$ is an integer from 1 to 6; polyhydroxy alcohols having the formula $$C_nH_{2n+2-m}(OH)_m$$

wherein $n$ is an integer from 3 to 4 and $m$ is an integer from 2 to 3; ethylene glycol; and alkyl phosphates having the formula $$(C_nH_{2n+1})_3PO_4$$

wherein $n$ is an integer from 1 to 4, said amine comprising from 5 mol percent to 25 mol percent of said mixture and said solvent being present in said electrolyte in a percentage of from about 30% to about 60% by weight of the phenol amine solute.

2. The electrolyte of claim 1 wherein the alkyl amine is tri-n-butyl amine and the solvent is butanol.

3. The electrolyte of claim 1 wherein the alkyl amine is tri-n-butyl amine and the solvent is trimethylene glycol.

4. The electrolyte of claim 1 wherein the alkyl amine is tri-n-butyl amine and the solvent is tri-n-butyl phosphate.

5. In combination the electrolyte of claim 1 as an ionic conductor between an electrolytically formed anode and a spaced cathode as an electrolytic capacitor.

References Cited in the file of this patent

UNITED STATES PATENTS

| | | |
|---|---|---|
| 2,036,669 | Yngve | Apr. 7, 1936 |
| 2,739,275 | Houtz et al. | Mar. 20, 1956 |
| 2,759,132 | Ross | Aug. 14, 1956 |
| 2,826,724 | Lilienfeld | Mar. 11, 1958 |
| 2,830,237 | Ross | Apr. 8, 1958 |

FOREIGN PATENTS

| | | |
|---|---|---|
| 387,437 | Great Britain | Feb. 9, 1933 |